June 20, 1961 A. LOGAN 2,988,773
APPARATUS FOR REMOVING MOLDED ARTICLES FROM MOLDS
Filed April 23, 1958 10 Sheets-Sheet 1

INVENTOR.
A. LOGAN
BY A. C. Schwarz, Jr.
ATTORNEY

INVENTOR.
A. LOGAN
BY
A.C. Schwarz, Jr.
ATTORNEY

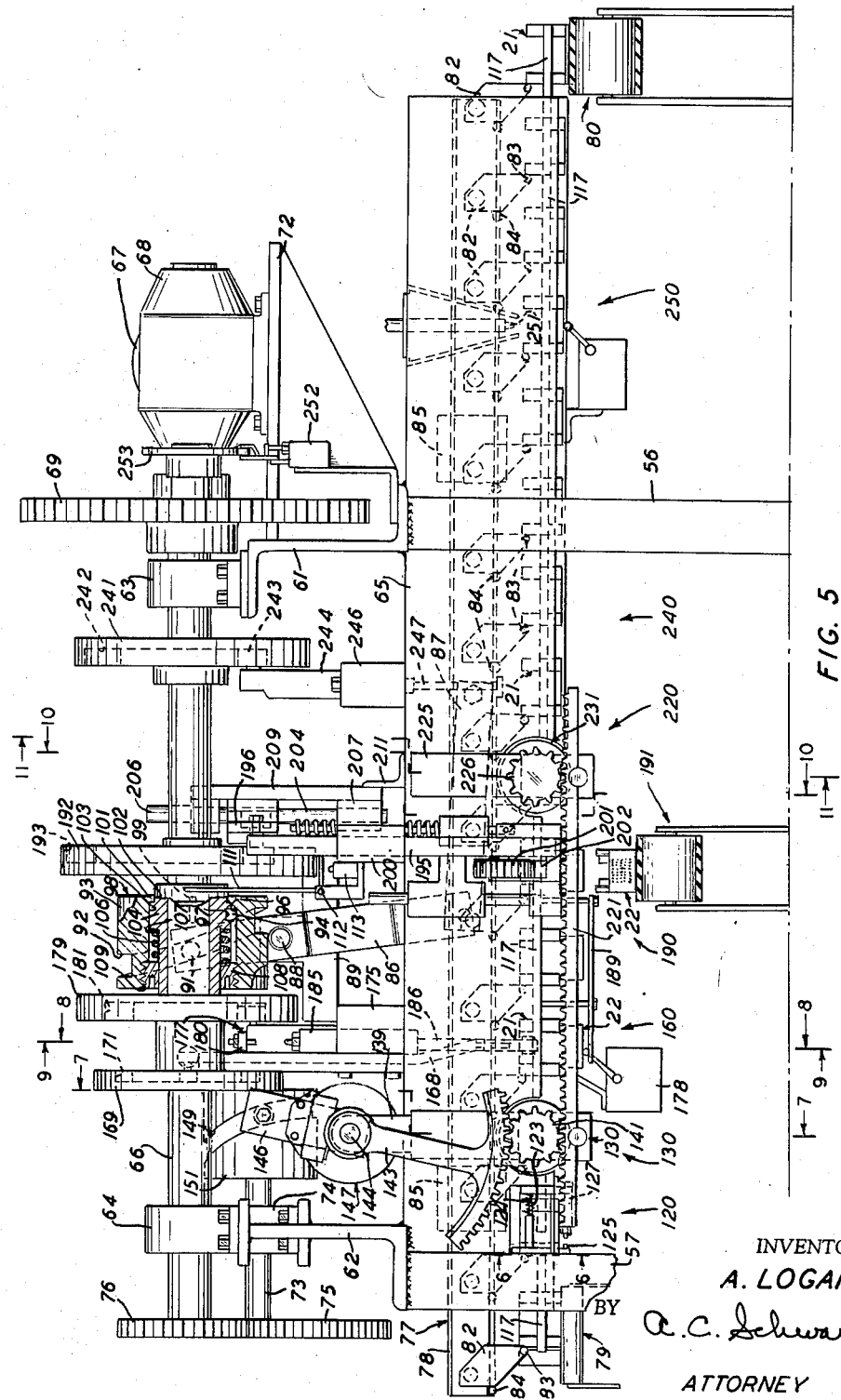

June 20, 1961 A. LOGAN 2,988,773
APPARATUS FOR REMOVING MOLDED ARTICLES FROM MOLDS
Filed April 23, 1958 10 Sheets-Sheet 4

INVENTOR.
A. LOGAN
BY
A. C. Schwarz, Jr.
ATTORNEY

June 20, 1961  A. LOGAN  2,988,773
APPARATUS FOR REMOVING MOLDED ARTICLES FROM MOLDS
Filed April 23, 1958  10 Sheets-Sheet 5

INVENTOR.
A. LOGAN
BY
ATTORNEY

June 20, 1961      A. LOGAN      2,988,773
APPARATUS FOR REMOVING MOLDED ARTICLES FROM MOLDS
Filed April 23, 1958      10 Sheets-Sheet 6

INVENTOR.
A. LOGAN
BY a.c. Schwey, Jr.
ATTORNEY

June 20, 1961    A. LOGAN    2,988,773
APPARATUS FOR REMOVING MOLDED ARTICLES FROM MOLDS
Filed April 23, 1958    10 Sheets-Sheet 10

INVENTOR.
A. LOGAN
BY H. J. Winegar
ATTORNEY

United States Patent Office 2,988,773
Patented June 20, 1961

2,988,773
APPARATUS FOR REMOVING MOLDED ARTICLES FROM MOLDS
Alexander Logan, Stoneleigh, Md., assignor to Western Electric Company, Incorporated, New York, N.Y., a corporation of New York
Filed Apr. 23, 1958, Ser. No. 730,355
1 Claim. (Cl. 18—2)

This invention relates to apparatus for removing molded articles of manufacture from molds and more particularly, although not exclusively, to apparatus for automatically removing cast resin terminal strip assemblies from open-ended and open-faced molds.

Cast resin terminal strip assemblies, such as those disclosed in the copending application, Serial No. 453,526, filed September 1, 1954 in the name of L. J. Moeller, now Patent 2,885,651, are utilized in the communications industry to facilitate the wiring of relay racks or other telephone apparatus assemblies requiring a multiplicity of communications circuits.

In the manufacture of such cast resin terminal strip assemblies, a plurality of square wire terminals which may be of different lengths are inserted into a pair of spaced, apertured, plastic, retaining plates to form a cage-like subassembly.

In the finished product, the ends of all of the terminals on one end of the terminal strip lie in a single plane perpendicular to the longitudinal axis thereof, whereas at the other end the lengths of the terminals in one row are all the same but the ends of the terminals in the various rows are staggered. The ends of all of the terminals project from open ends in the mold.

In the construction of the terminal strip assembly, the subassembly, including apertured, plastic, retaining plates with a plurality of wire terminals extending therethrough, is inserted in an open-ended and open-faced mold. The retaining plates positioned in the opposing ends of the mold serve to maintain the terminals in predetermined positions in the mold and form the ends of the mold. Liquid resin is cast to fill the space between intermediate portions of the wire terminals to form an insulating matrix embedding the portions of terminals extending between the apertured, plastic, retaining plates. The cast resin is then cured to form a rigid block around the intermediate portions of the terminals and to form a finished cast resin terminal strip assembly which is removed subsequently from the mold.

An object of the present invention is to provide apparatus for removing, automatically, molded articles of manufacture from open-ended and open-faced molds.

Another object of the present invention is to provide apparatus for performing any or all of the following steps which include feeding an open-ended and open-faced mold containing a molded article of manufacture into an apparatus for removing the molded article from the mold, checking portions of the profile of the mold and of the molded article contained therein, inverting the mold containing the article, retracting core pins from the article in the cavity of the mold, partially ejecting the article from the mold, returning the core pins into the cavity of the mold, completing the removal of the article from the mold by a stripping operation, removing the article from the apparatus, reverting the mold to its original oriented position, spraying material onto the mold, and removing the mold from the apparatus, all automatically, while each individual mold is being advanced intermittently to successive stations in the apparatus by intermittent operation of a hitch-feed, indexing means.

An apparatus for removing molded articles of manufacture from open-faced, open-ended molds which utilize certain features of the present invention may comprise means for advancing the molds through the apparatus, means for supporting the molds as they are advanced through the apparatus, means reciprocable into the cavity of a mold for partially ejecting the molded article therefrom, means which may be inserted into the open ends of the mold and into the empty portion of the cavity of the mold adjacent to the partially ejected molded article and which may be moved vertically for stripping the molded article completely from the mold, and means for operating automatically in a timed sequence the advancing means, the ejecting means and the stripping means on a series of molds advanced successively through the apparatus.

A still further object of the present invention is to provide automatically operated apparatus for removing the molded articles of manufacture from molds, which is durable, simple in construction and efficient in operation.

Other objects and features of the invention will be more readily understood from the following detailed description of a specific embodiment thereof, when read in conjunction with the accompanying drawings, in which:

FIG. 5 is a fragmentary, side elevational view of the apparatus of FIG. 4;

Figure 1:
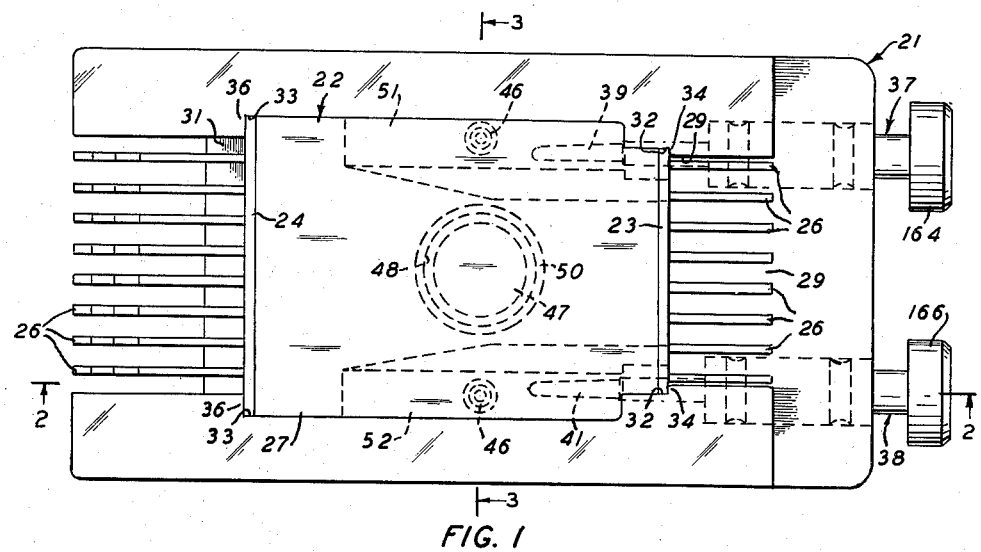
FIG. 1 is a top plan view of a mold containing a cast resin terminal assembly.
Figure 2:
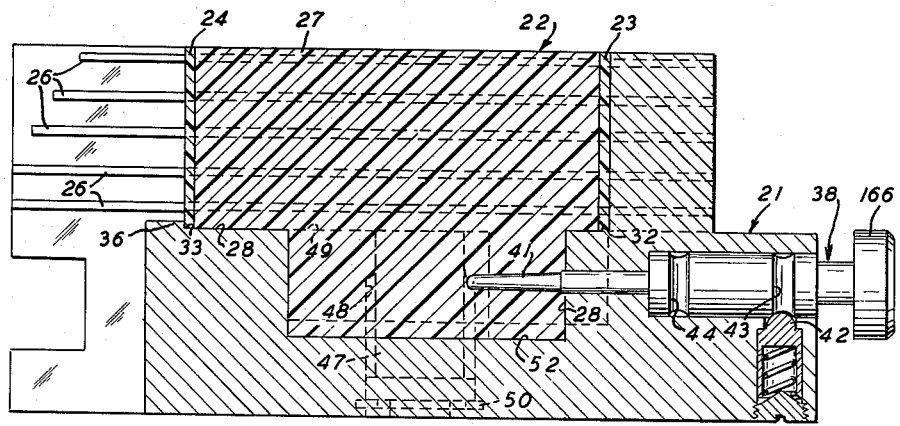
FIG. 2 is a sectional view of the mold and terminal assembly of FIG. 1 taken along the line 2—2 thereof.
Figure 3:
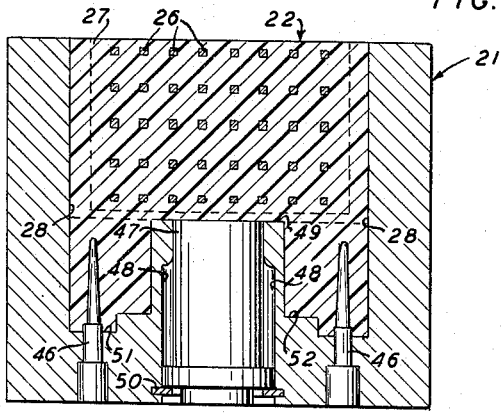
FIG. 3 is a sectional view of the mold and terminal assembly of FIG. 1 taken along the line 3—3 thereof.

Referring now to the drawings, and more particularly to FIGS. 1, 2 and 3 thereof, there is shown a mold, designated generally by the numeral 21, containing a cast resin terminal assembly, designated generally by the numeral 22. The finished terminal assembly 22 includes two spaced, parallel, apertured, plastic, retaining plates 23 and 24, a plurality of pretwisted, parallelly disposed square wire terminals 26—26 and a block 27 of cast resin material filling all the space between the retaining plates 23 and 24 and embedding the intermediate portions of the plurality of spaced terminals 26—26 extending through the apertures in the plates 23 and 24.

The resin, forming the block 27, is cast around a cage-like subassembly consisting of the two apertured, plastic, retaining plates 23 and 24, through and between which the plurality of pretwisted wire terminals 26—26 extend. In the formation of the cage-like subassembly, the apertured, plastic, retaining plates 23 and 24 are held together in face to face contact while the pretwisted terminals 26—26 are inserted into the apertures therein. The plastic retaining plates 23 and 24 are then spaced apart a predetermined distance and become locked to the wire terminals 26—26 by resultant torques set up as a result of the pretwist of the terminals 26—26 in opposite directions.

The mold 21, which is generally rectangular in shape and is provided with a cavity 28, is designed to receive the cage-like subassembly and resin casting or potting compound which is molded about the central portion of the wire terminals 26—26 of the subassembly and cured subsequently to form the cast resin block 27 partially encapsulating the plurality of elongated rod-like terminals 26—26.

As illustrated in the drawings, the ends 29 and 31 of the mold 21 are open. However, the ends of the mold are provided with recesses 32 and 33, designed to receive and retain the edges of the plastic retaining plates 23 and 24, respectively, of the subassembly. When the subassembly is inserted into the mold cavity 28, the plastic retaining plates 23 and 24 are received against shoulders 34 and 36 of the recesses 32 and 33, respectively, and are utilized to seal the open ends 29 and 31, respectively, of the mold 21. In this way, the plastic retaining plates 23 and 24 function as ends of the mold 21 to retain the viscous, plastic, potting compound or casting resin within the mold cavity 28 so that the resin will surround the portions of the wire terminals 26—26 projecting through and extending between the retaining plates 23 and 24.

Mounted slidably within the right-hand end of the mold 21, as viewed in FIGS. 1 and 2, is a pair of core pins, designated generally by the numerals 37 and 38, the inner end portions 39 and 41 of which project into the mold cavity 28. Each of the core pins 37 and 38 may be engaged selectively in either of two positions, in a normal, inserted position or a retracted position, by a spring-pressed detent 42, which cooperates with annular grooves 43 and 44 on the periphery of each of the core pins 37 and 38. Mounted fixedly in the bottom of the mold 21 is a pair of spaced, tapered core pins 46—46, the upper ends of which project vertically into the cavity 28, as viewed in FIG. 3.

Because of the fact that the two pairs of core pins 37 and 38, and 46—46 project in different directions and because the molded article 22 must be removed upwardly from the cavity 28 of the particular mold 21, as viewed in FIGS. 2 and 3, it is necessary to retract the slidable pins 37 and 38 prior to the removal of the molded article 22 upwardly, vertically off of the fixed core pins 46—46, as viewed in FIG. 3.

To facilitate the partial removal of the finished cast resin terminal strip assembly 22 from the mold 21, a shouldered ejector pin 47 is mounted slidably within a complementary shouldered bore 48 in the bottom of the mold 21. The ejector pin 47 is retained in the bore 48 by a C-shaped snap ring 50 and the shoulder of the bore 48.

Normally, one end of the ejector pin 47 is flush with the adjacent portion 49 of the bottom surface of the cavity 28. However, it should be noted that the bottom of the cavity 28 of the mold 21 does not lay in a single, horizontal plane, but the outer, opposite portions 51 and 52 of the cavity 28 into which the pins 46—46 project, recede below the upper surface of the ejector pin 47, as viewed in FIGS. 2 and 3.

After the cast resin terminal assembly 22 has been formed in the manner described above and the resin therein has been cured in an oven or by other appropriate means (not shown), the cast resin terminal assembly 22 can be removed partially by the ejector pin 47 by forcing it against the molded block 27 of the finished terminal assembly 22.

Figure 4:
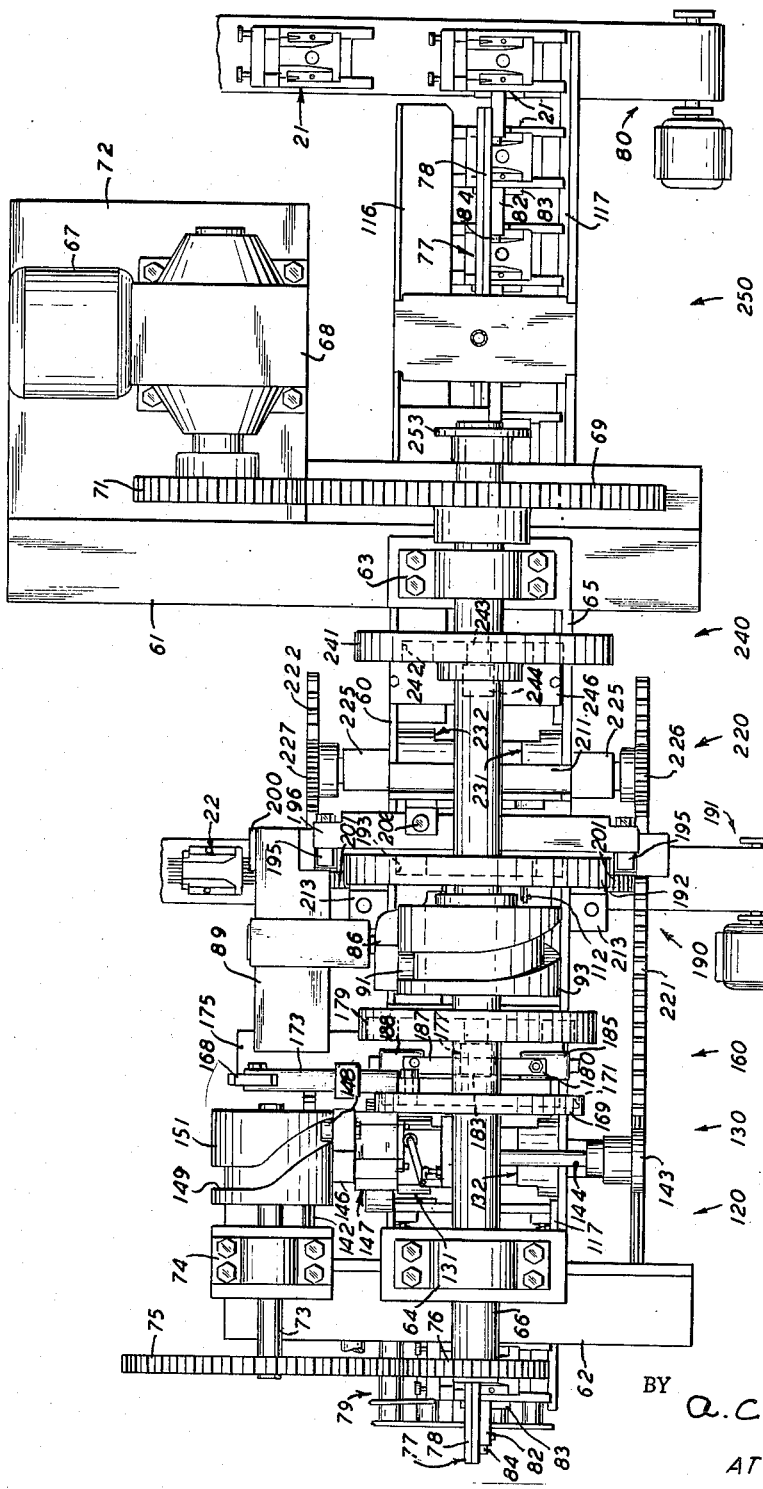
FIG. 4 is a fragmentary, top plan view of a specific embodiment of an apparatus for removing the terminal assembly from the mold illustrated in FIGS. 1 to 3, inclusive.

Referring now to FIGS. 4 to 11, inclusive, and more particularly to FIGS. 4 and 5, there is shown an apparatus, designed for removing the finished, cast-resin, terminal assemblies 22—22 from the individual molds 21—21, which includes a framework having a plurality of vertical supports 56—56 and 57—57. Secured to the upper extremity of the vertical supports 56—56 and 57—57 are angle irons 61 and 62, respectively, onto which are secured pillow blocks 63 and 64. The pillow blocks 63 and 64 support a main cam shaft 66 adjacent to the end portions thereof. The cam shaft 66 is connected to an electric motor 67 or other appropriate means by an appropriate gear reducer 68 and a pair of gears 69 and 71.

The electric motor 67 and gear reducer 68 are both supported on a shelf 72 secured to the angle iron 61 and supported thereby. The cam shaft 66 is connected operatively to a second cam shaft 73, which is mounted rotatably in a pillow block 74 supported by the angle iron 62, by a pair of gears 75 and 76. Secured to the intermediate portions of the angle irons 61 and 62, by welds or other suitable means, and depending therefrom are spaced, longitudinally extending plate members 60 and 65 (FIGS. 6 to 11, inclusive).

A horizontal hitch-feed, mold indexing means, designated generally by the numeral 77, is provided with a reciprocating bar 78 extending longitudinally of the apparatus for indexing each mold 21, step by step, from a conveyor, designated generally by the numeral 79, at the mold receiving position at the extreme left-hand side of the apparatus, as viewed in FIGS. 4 and 5, through a series of successive operating stations in the apparatus to the right-hand side of the apparatus, as viewed in FIGS. 4 and 5, where the mold 21 is discharged onto a conveyor, designated generally by the numeral 80, to remove it from the apparatus.

The indexing means 77, including the reciprocating bar 78, extends longitudinally of the apparatus. The bar 78 is mounted slidably in T-shaped slots 81—81 in spaced supports 85—85 secured to the upright plate member 60. Depending from the reciprocating bar 78 are a plurality of pivotally mounted pusher arms 82—82. Mounted fixedly on the lower ends of the pusher arms 82—82 are transversely extending bars 83—83, designed to engage the left-hand sides of the molds 21—21 when the mold indexing means 77 is moved to the right, as viewed in FIGS. 4 and 5.

The pusher arms 82—82 are mounted so that they are free to pivot approximately 90° in a counterclockwise direction, as viewed in FIG. 5, but are prevented from pivoting clockwise from the normal position, as viewed in FIG. 5, by suitable stop members 84—84. The pusher arms 82—82 are spaced equally apart, the distance between them being equal to the distance between the operating stations or a fraction thereof.

Figure 7:
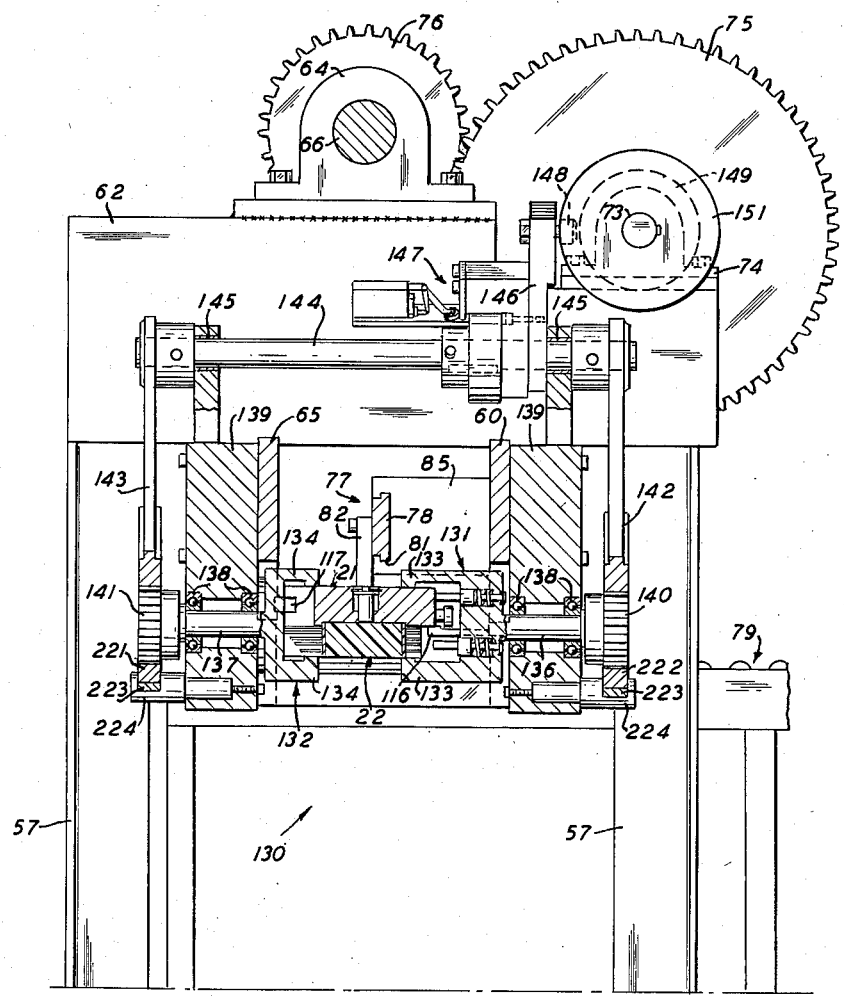
FIG. 7 is a fragmentary, enlarged, sectional view of the apparatus of FIG. 5 taken along the line 7—7 thereof.
Figure 8:
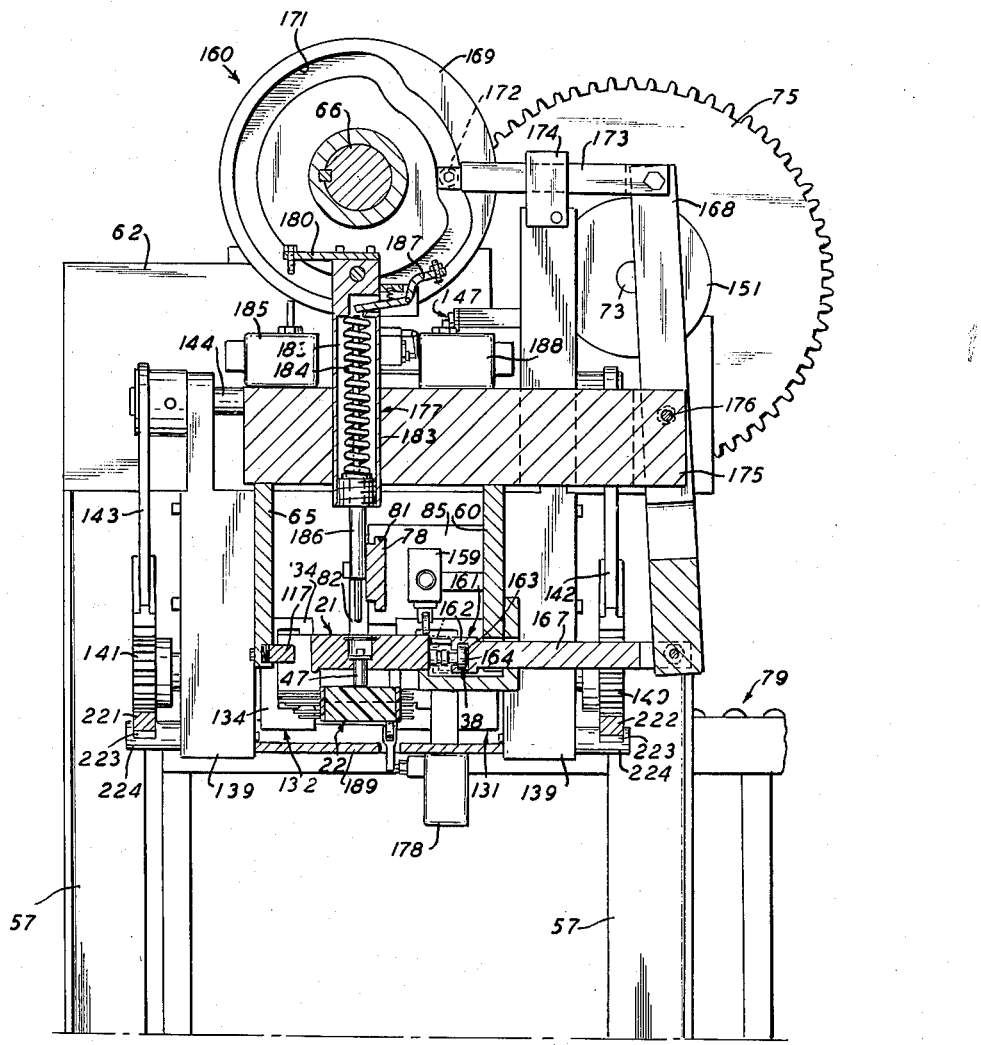
FIG. 8 is a fragmentary, enlarged, sectional view of the apparatus of FIG. 5 taken along the line 8—8 thereof.
Figure 9:
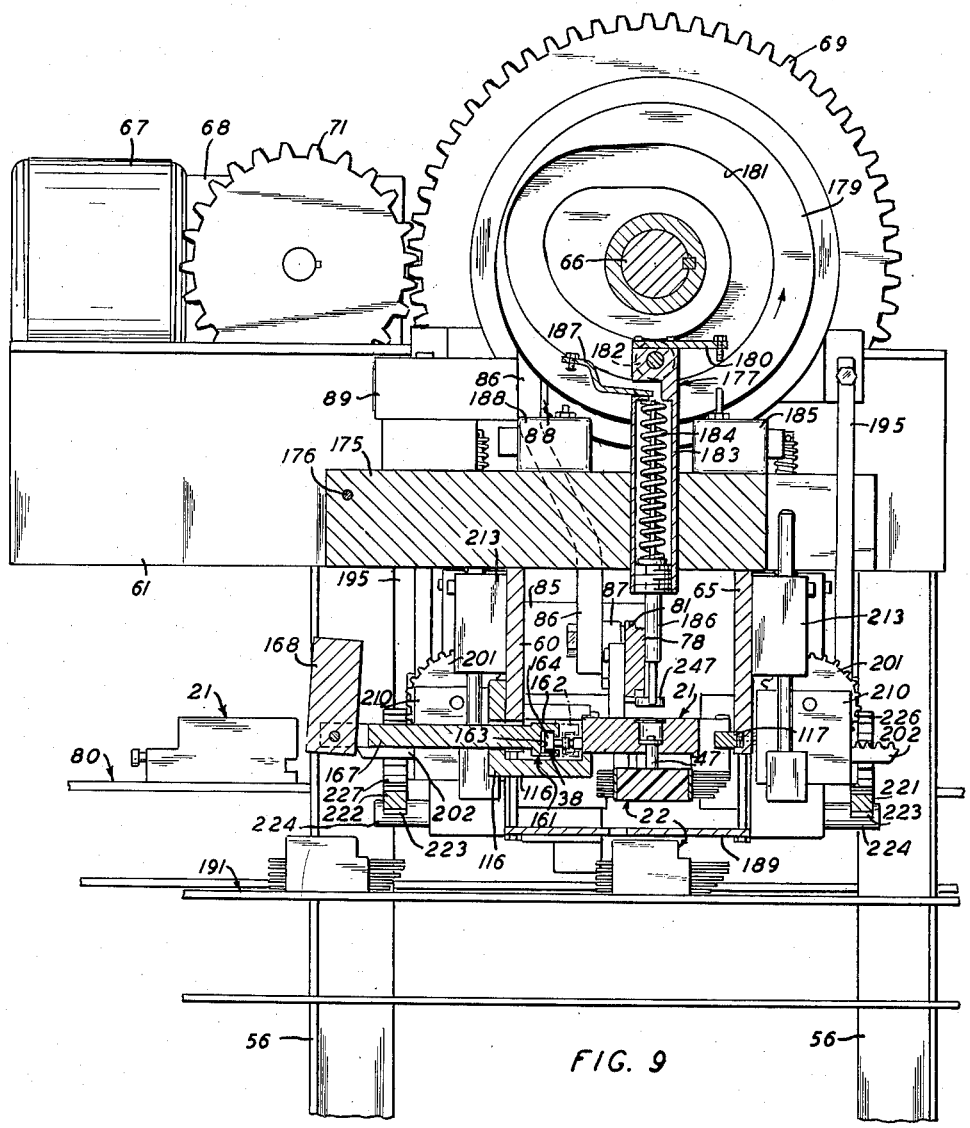
FIG. 9 is a fragmentary, enlarged, sectional view of the apparatus of FIG. 5 taken along the line 9—9 thereof.
Figure 10:
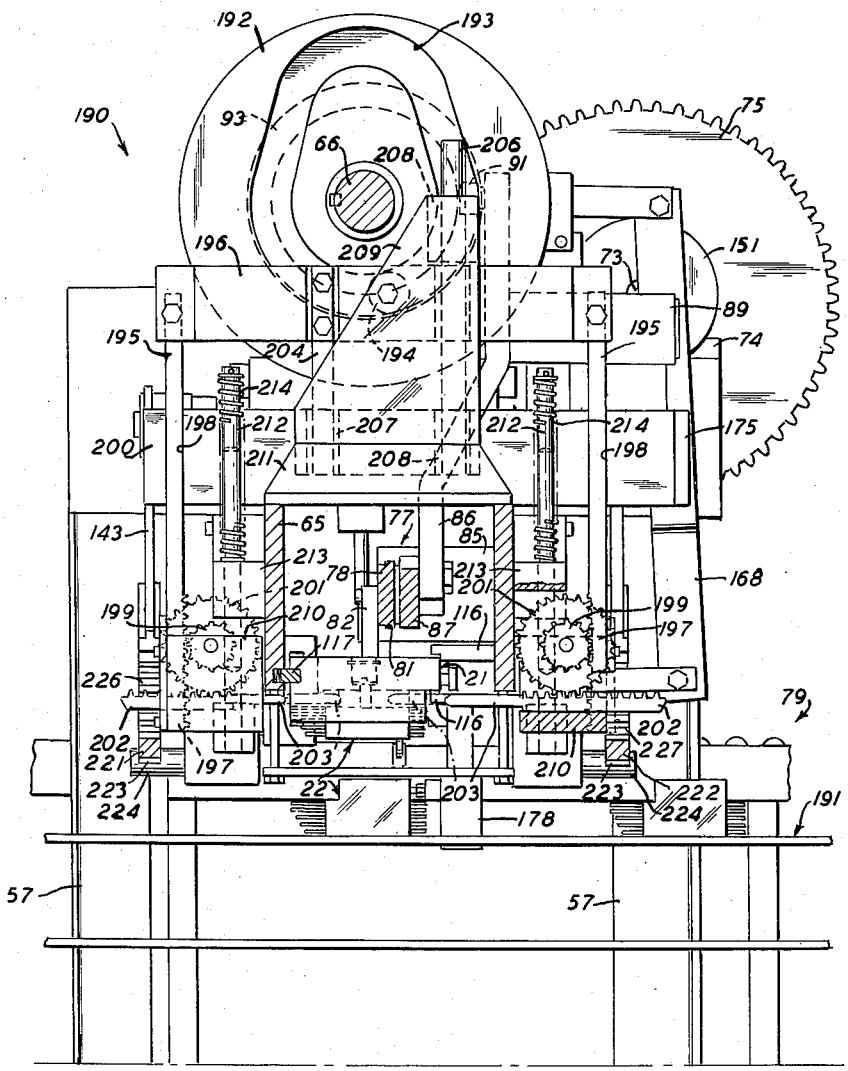
FIG. 10 is a fragmentary, enlarged, sectional view of the apparatus of FIG. 5 taken along the line 10—10 thereof.

It should be noted that most of the pusher arms 82—82 depend from the left-hand side of the reciprocating bar 78, as viewed in FIGS. 7, 8 and 10, the exceptions being where the pusher arms 82—82 in that position would interfere with the moving parts of the apparatus and then the pusher arms 82—82 are secured pivotally to and depend from the opposite side of the reciprocating bar 78 (see FIG. 9).

Figure 11:
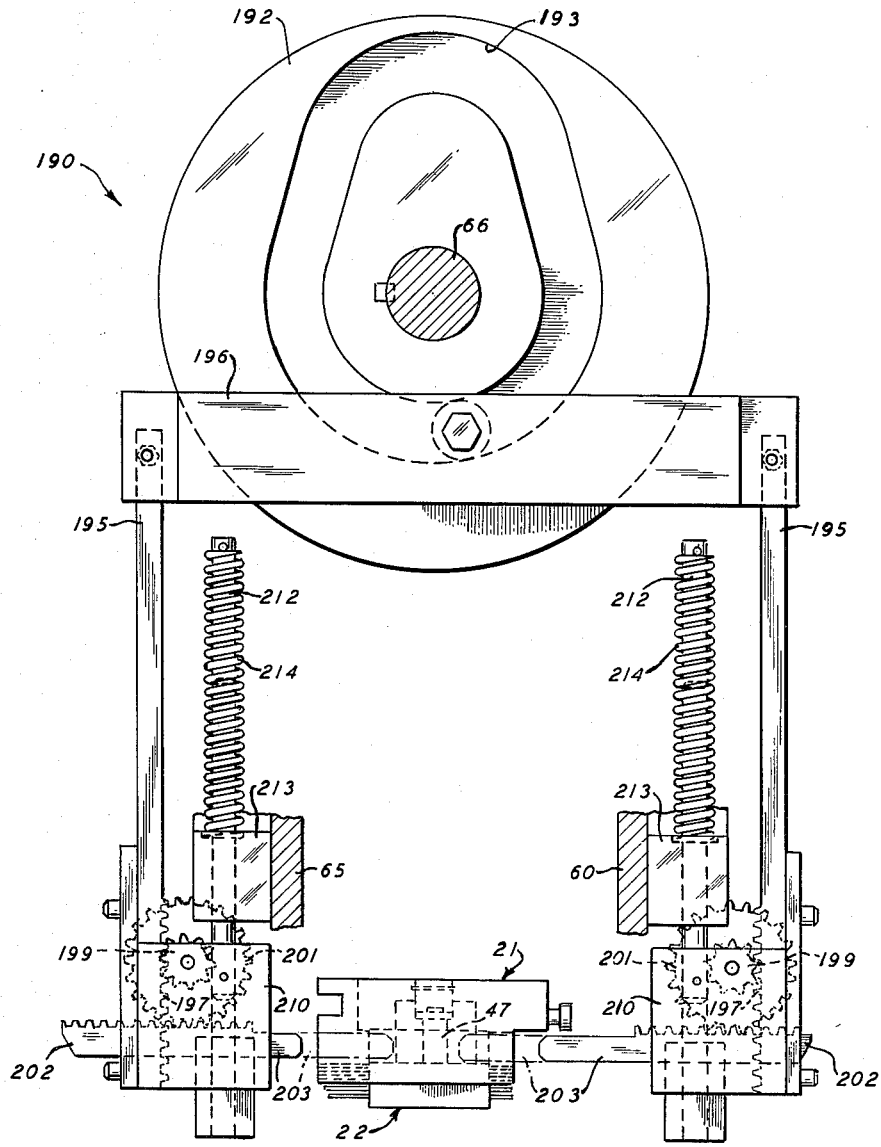
FIG. 11 is a fragmentary, enlarged view showing elements of FIG. 10 that move during a final stripping operation.
Figure 12:
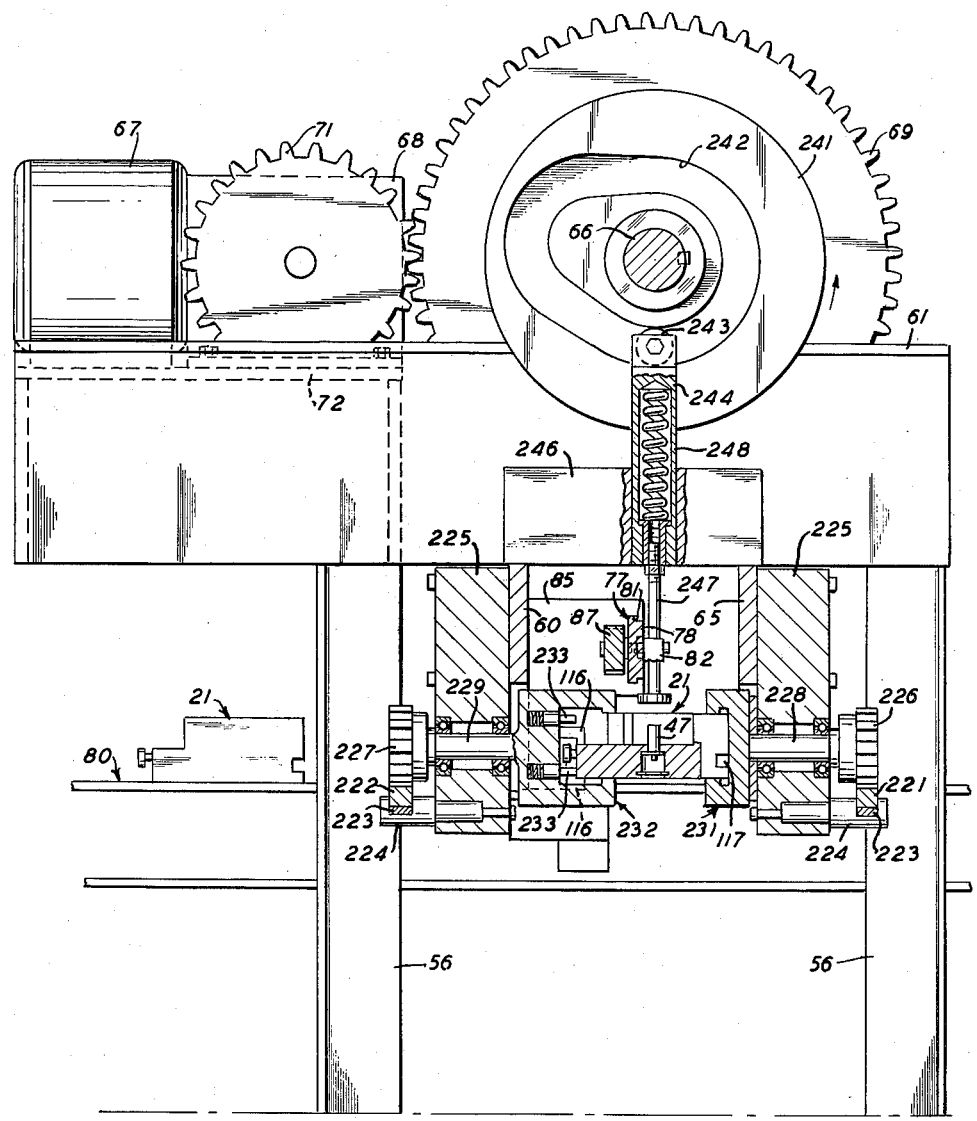
FIG. 12 is a fragmentary, enlarged, sectional view of the apparatus of FIG. 5 taken along the line 11—11 thereof.
Figure 13:
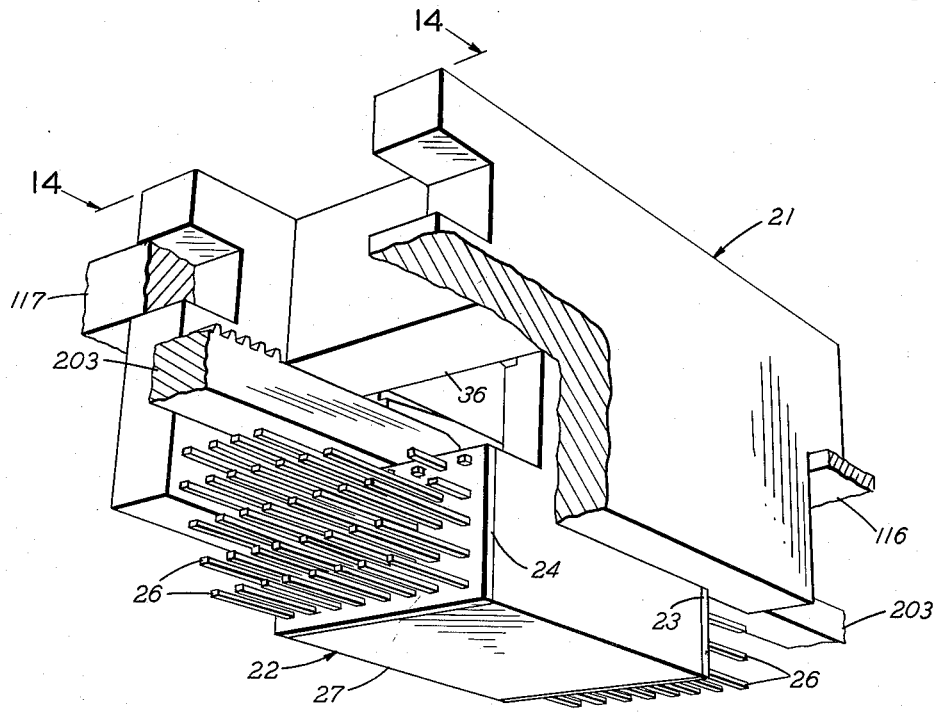
FIG. 13 is an enlarged, fragmentary, perspective view of a mold containing a partially ejected molded article with stripping fingers of the apparatus of FIG. 5 inserted in the ends of the mold.
Figure 14:
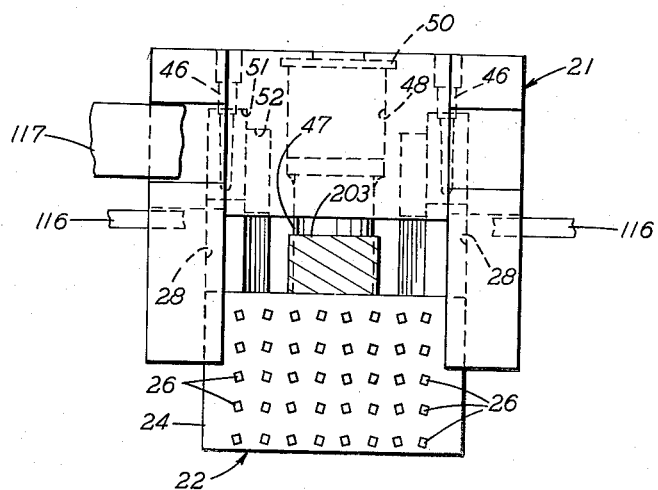
FIG. 14 is a reduced, vertical section taken along line 14—14 of FIG. 13.

The reciprocating bar 78 of the mold indexing means 77 is connected to and reciprocated periodically between predetermined limits by a crank arm 86 and a link 87 (see FIGS. 5, 10 and 11). The crank arm 86 is mounted pivotally on a pin 88, positioned in and supported by a pillow block 89 and bends inwardly therefrom toward the center of the apparatus. The crank arm 86 is connected to and is oscillated back and forth by a cam follower 91 mounted slidably and rotatably in a peripheral groove 92 in a drum cam 93 mounted slidably on the cam shaft 66 and prevented from rotating with respect thereto by means of a key 94 extending between an internal keyway 96 on the drum cam 93 and an external keyway 97 on a shoulder tubular sleeve, designated generally by the numeral 98. The shoulder tubular sleeve 98, in turn, is mounted on the cam shaft 66 and prevented from moving with respect thereto by means of a key 99.

Since it is desirable to stop the operation of the apparatus if and when the mold indexing means 77 becomes jammed as a result of some irregularity in the operation of the apparatus, the drum cam 93 is provided with an internally extending shoulder 101, formed by means of a bore 102 and a counter bore 103, which is contiguous with a shoulder 104 on the tubular sleeve 98 to prevent relative movement of the tubular sleeve 98 with respect to the drum cam 93 in one direction. A compression spring 106 is positioned around the sleeve 98 between a shoulder 107 on the tubular sleeve 98 and the inside surface of an externally threaded annular member 108, threadedly engaged in an internally threaded counterbore 109 within the drum cam 93.

This construction permits the drum cam 93 to move toward the right, as viewed in FIG. 5, against the action of the compression spring 106 when excessive force is required to push the reciprocating bar 78 to the right, as viewed in that figure. If the drum cam 93 moves to the right, as viewed in FIG. 5, against the action of the spring 106, a substantially L-shaped, pivotally mounted switch actuator 111 will be moved about a pivot point 112 to actuate a switch 113 which, in turn, de-energizes the motor 67.

The compression on the spring 106 and thus the force required to cause relative movement between the sleeve 98 and the drum cam 93 may be adjusted by turning the threaded, annular member 108 in the appropriate direction to change the relative position of the annular member 108 and the shoulder 107.

When the mold indexing means 77 moves to the left, as viewed in FIGS. 4 and 5, each of the pusher arms 82—82 pivots counterclockwise and rides over each of the molds 21—21, then positioned immediate to the left thereof, so that when the mold indexing means 77 is moved subsequently to the right, each of the pusher arms 82—82 engages a mold 21 and pushes it to the right. In this manner, each mold 21 is indexed to a succeeding operating station or to an intermediate position between adjacent operating stations in the apparatus every time the reciprocating bar is moved to the right, as viewed in FIGS. 4 and 5. Also, an empty mold 21 is discharged from the apparatus and a new mold 21 containing an article 22 is fed into the apparatus with each indexing.

Spaced tracks 116 and 117 are secured to the upright plates 60 and 65, respectively, for supporting the opposite ends 29 and 30, respectively, of the molds 21—21 as they are advanced sideways therealong, by the mold indexing means 77. It should be noted that the track members 116 and 117 are not continuous along the entire length thereof due to the position of various elements at the different operating stations and also that the heights of the segments of the tracks are at different levels along different portions of the path of travel of the molds 21—21 as a result of the molds 21—21 being inverted and reverted at various stations.

This construction is desirable so that the upper and the lower extremities of the molds 21—21 in all stations fall in common planes, regardless of the orientation thereof. It should also be noted that one of the track members 117 is spring-biased and cooperates with the other track member 116 to serve as a clamping means to prevent the molds 21—21 from moving unintendedly, and to prevent each of the molds 21—21 from moving past the position where it is moved normally by the pusher arm 82 associated therewith.

The molds 21—21 enter the apparatus from the conveyor 79 which carries the molds 21—21 containing the molded articles of manufacture 22—22 from the curing oven (not shown) to the entrance end of the guideway of the apparatus formed by the tracks 116 and 117 with the open portion of each of the molds 21—21 facing upwardly. The indexing means 77 moves each mold 21 containing the molded article 22 to a first operating station, designated generally by the numeral 120, wherein the molded article 22 is gauged to determine if the article 22 is oversized and, if oversized, the article 22 is prevented from passing therethrough.

Figure 6:
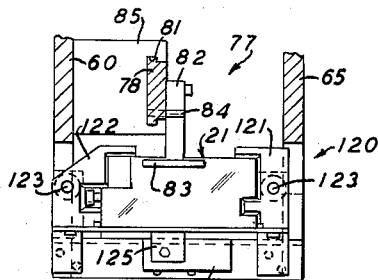
FIG. 6 is a fragmentary, enlarged, sectional view of the apparatus of FIG. 5 taken along the line 6—6 thereof.

The details of the mold gauging station 120 are illustrated in FIGS. 5 and 6. Referring now to FIG. 6, the mold gauging station 120 includes two gauge members 121 and 122 which are configurated so as to match the side profiles of the mold 21. The gauge members 121 and 122 are mounted slidably on supporting rods 123—123, secured to the plates 60 and 65, and are urged normally to the left, as viewed in FIG. 5, by compression springs 124—124.

Any mold 21 which, due to the excess of casting resin on the article 22 or some other irregularity such as one or more of the core pins being in a retracted position, is too large to pass through the apparatus, will engage one or more of the gauging members 121 and 122 and will force the latter to the right, as viewed in FIG. 5, against the action of the springs 124—124. When the gauging members 121 and 122 are moved to the right, a striker 125, which is mounted thereon, is moved against an actuator 126 of a sensitive switch 127, associated with an electrical control circuit (not shown), whereby the switch 127 is operated to de-energize the motor 67 and hold it de-energized until an operator removes the oversized mold 21.

From the mold gauging station 120, the mold 21 is indexed to a mold inverting station, designated generally by the numeral 130, which is designed to turn the mold 21 180° into an upside-down or inverted position. The details of the mold inverting station 130 are more clearly illustrated in FIG. 7.

Referring now to FIG. 7, the mold inverting station 130 is provided with two rotatable paws, designated generally by the numerals 131 and 132, which are provided with fixed jaws 133—133 and 134—134, respectively, which are positioned normally in alignment with the tracks 116 and 117 for receiving the ends 29—29 and 31—31, respectively, of the molds 21—21 therebetween.

The paws 131 and 132 are mounted on the ends of stub shafts 136 and 137, respectively, which, in turn, are mounted rotatably in bearings 138—138 mounted in blocks 139—139 secured on the outside surfaces of the plates 60 and 65. The stub shafts 136 and 137 are provided with pinion gears 140 and 141, respectively, which mesh with segmented gears 142 and 143. The segmented gears 142 and 143 are mounted at opposite ends of a transversely extending shaft 144 and secured fixedly thereto.

The shaft 144 is mounted in bearings 145—145 in brackets integral with the blocks 139—139. The shaft 144 is connected operatively to one end of an oscillating crank arm 146 by a clutch 147. The opposite end of the crank arm 146 is connected to a cam follower 148 positioned slidably and rotatably within a slot 149 of a drum cam 151 keyed to the cam shaft 73. The drum cam 151 is connected to and driven by the motor 67 through the gear reducer 68, the pair of gears 69 and 71, the cam shaft 66, the pair of gears 75 and 76, and the cam shaft 73 to rotate the paws 131 and 132 180° and invert the mold 21.

It should be noted that, since the paws 131 and 132 are rotated 180° in one direction during one rotation of the cam shaft 66 and then rotated 180° in the other direction during the succeeding rotation of the cam shaft 66, it is desirable to have the cam 151 make one complete revolution for every two revolutions of the cam shaft 66. Therefore, it is necessary that the circumference of the gear 75 be twice that of the gear 76 resulting in one gear having twice as many teeth as the other.

If, as a result of irregular operation of the apparatus or for some other reason, the apparatus becomes jammed so that torsion, above a predetermined torque, would be required to turn the shaft 144, the clutch 147 will slip and a switch actuator 152 attached thereto will depress a switch 153 associated therewith to de-energize the motor 67.

The inverted mold 21 is then indexed to the right to a subsequent station, designated generally by the numeral 160, wherein the end portions 39 and 41 of the core pins 37 and 38, respectively, are retracted from the mold cavity 28. The molded article 22 is partially ejected to a position below the core pins 37 and 38 and the core pins 37 and 38 are reseated or returned to their normal, inserted position wherein the end portions 39 and 41 thereof extend into the mold cavity 28. The details of the station 160 are more clearly illustrated in FIG. 8.

Referring now to FIG. 8, there is shown a core extracting and inserting paw, designated generally by the numeral 161, provided with a pair of spaced, fixed jaws 162—162 which define an elongated channel 163. When an inverted mold 21 is indexed into position in the station 160, a normally closed switch 159, connected in the power leads of the motor 67, is actuated and enlarged head portions 164 and 166 of the slidable core pins 37 and 38, respectively, enter the elongated channel 163 between the jaws 162—162 on the paw 161. The normally closed switch 159 is provided in the power leads of the motor 67 to permit the apparatus to operate even if there is no mold 21 at the station 160, but to prevent it from operating if a mold 21 is located in the station 160 and the article 22 is not stripped therefrom.

The paw 161 is attached to one end of a slidable rod 167 which, in turn, is connected to a curved linkage arm 168 operated by a slotted cam 169 having a cam slot 171 eccentric to the axis thereof. The linkage arm 168 is connected to a cam follower 172 by a cam-follower rod 173. When the cam 169 is rotated by the cam shaft 66, the cam follower 172, slidably and rotatably mounted in the slot 171, is moved radially of the cam shaft 66 to reciprocate the cam-follower rod 173 within a bearing 174, supported by a transverse block 175 secured to the frame. The cam-follower rod 173, in turn, oscillates the linkage arm 168 pivotally secured in a slot in the block 175 by a pin 176 which, in turn, reciprocates the rod 167 secured to the pin extracting and inserting paw 161.

The cam 169 operates to move the paw 161 between a normally extended position wherein it is in alignment for receiving the head portions 164 and 166 of the core pins 37 and 38, respectively, as illustrated in phantom lines in FIGS. 8 and 9, and a retracted position, as illustrated in solid lines in FIGS. 8 and 9, wherein the paw 161 withdraws the pins 37 and 38 simultaneously to a retracted position.

While the pins 37 and 38 are held in the retracted positions, an article ejecting means, designated generally by the numeral 177, is utilized to force the ejector pin 47 into the mold cavity 28 to loosen the finished cast resin terminal assembly 22 and to push the terminal assembly 22 partially out of the mold. The movement of the ejector means 177 to its most downward position results in a switch actuator 180 actuating a normally closed switch 185 connected in parallel with the switch 159 in the power leads of the motor 67.

The assembly 22, while being pushed partially out of the mold 21, actuates a normally open switch 178 connected in parallel with the switches 159 and 185 in the power leads of the motor 67. Subsequently, the core pins 37 and 38 are returned by the paw 161 so that the inner ends 39 and 41, respectively, thereof project into the now partially empty cavity 28 of the mold 21 above the partially ejected molded assembly 22.

As illustrated in FIGS 8 and 9, the article ejecting means 177 includes a slotted cam 179 in which a slot 181 of the cam 179 is eccentric with respect to the axis of the cam shaft 66. When the cam 179 is rotated by the cam shaft 66, a cam follower 182, mounted slidably and rotatably in the cam slot 181, causes a housing 183, a compression spring 184, and a shouldered, spring-biased plunger 186, mounted slidably in the housing 183 and urged against the end thereof by the spring 184, to be reciprocated, in the block 175, to push the ejector pin 47 downwardly for partially removing the molded article 22 from the mold 21.

The compression spring 184 in the housing 183 permits the plunger 186 to slide within the housing 183 if, for some reason, the pin 47 is jammed or an excessive amount of force is necessary to move the plunger 186 with respect to the mold 21. In that event, the free end of a pivotally mounted switch actuator 187 will be forced downwardly by the relative movement of the plunger 186 with respect to the housing 183 to actuate a normally closed, sensitive switch 188 associated with the control circuit to de-energize the motor 67 until the irregularity causing the switch to be actuated is corrected.

As a result of the arrangements of the switches 159, 178, 185 and 188, when one of the molds 21—21 is indexed into the station 160, the normally closed switch 159 is actuated to open the contacts thereof and thus leave only switch 185 to pass current to the motor 67. Subsequently, as the article 22 is being ejected partially from the mold 21, the normally open switch 178 is actuated to close contacts asociated therewith to complete a circuit therethrough to permit the transmission of power to the motor 67. If, when the normally closed switch 185 is actuated and opened at the completion of the travel of the ejecting means in the downward position, the switch 178 has not been closed by one of the articles 22 being removed from the mold 21 positioned in station 160, the motor 67 will become de-energized and will stop the operation of the apparatus. However, even if the switch 178 has been closed, if the article 22 is not moved downwardly a predetermined distance, the normally closed switch 188, which is in series with the parallel circuit containing the switches 159, 178 and 185, will be actuated to de-energize the motor 67 and stop the operation of the apparatus. In this manner, irregularities in the mold 21, the molded article 22 and the operation of the apparatus are detected and the operation of the apparatus is stopped as a result thereof.

If, for some reason, the molded article 22 drops further than the length of movement of the end of the pin 47, a plate 189, which is secured to and depends from the upright plates 60 and 65, catches the molded article 22 to prevent it from being completely removed from the mold 21. This permits the mold 21 to cause the article 22 to be slid therealong, until the article 22 arrives at an article stripping station, designated generally by the numeral 190, at which it is to be removed from the apparatus by a continuously moving, endless belt conveyor, indicated generally by the numeral 191.

The mold 21 with the finished cast resin terminal assembly 22 partially removed therefrom is advanced next to the article stripping station 190, which is illustrated in detail in FIG. 10.

As illustrated in FIG. 10, the article stripping station 190 includes a slotted cam 192 in which a slot 193 of the cam 192 is eccentric with respect to the axis of the cam shaft 66. A cam follower 194 is secured to a horizontal bar 196. The horizontal bar 196 supports vertically depending rack rods 195—195 which are secured adjacent to the opposing ends thereof. The rack rods 195—195 are mounted slidably in notches 198—198 in a stationary, horizontal block 200 supported by the plates 60 and 65. Formed on the lower end portions of the rack rods 195—195 are rack gears 197—197.

In operative engagement with each of the lower ends of the rack gears 197—197 are pinion gears 199—199. The pinion gears 199—199, in turn, are secured rigidly to or integral with larger pinion gears 201—201 which, in turn, are in operative engagement with rack gears 202—202. The rack gears 202—202 have tapered ends 203—203 which form fingers. The ends 203—203 of the rack gears 202—202 project horizontally inwardly therefrom for insertion into the opposite open ends 29 and 31 of the mold 21 above the upper extremity of the partially removed molded article 22 and the bottom portion 49 of the mold cavity 28 as a result of the rotation of the cam 192, the vertical reciprocation of the horizontal bar 196 and the rack gears 197—197, the rotation of the pinion gears 199—199 and 201—201, and the horizontal reciprocation of the rack gears 202—202.

The horizontal bar 196 is secured fixedly to a rod 204 and slidably to a rod 206. The rods 204 and 206 are mounted slidably in bearing blocks 207, and 208—208, respectively. The bearing blocks are secured to a stationary, vertically extending plate 209 which, in turn, is secured to an angle iron 211 secured to and supported by plates 60 and 65.

The pinion gears 199 and 201 and the rack gear 202 on each side of the apparatus are mounted rotatably and slidably, respectively, in a yoke 210 secured to a rod 212 which, in turn, is mounted resiliently in a bearing block 213, by a spring 214, secured to and supported by the plates 60 and 65 of the frame. When the horizontal bar 196 is reciprocated a predetermined distance, the bar 196 will come into engagement with the two vertical rods 212—212 supporting the rack gears 202—202 and pinion gears 199—199 and 201—201 to force the rods 212—212 and thus the pinion gears 199—199 and 201—201, and the rack gears 202—202 and projecting ends 203—203 thereof downwardly. The downward movement of the projecting ends 203—203 force the molded article 22 free from the mold 21 to cause it to drop on the endless belt conveyor 191, positioned directly below the station 190, which removes the molded article 22 from the apparatus.

Assuming that the molded article 22 has just been stripped completely from the mold 21 by the projecting ends 203—203 of the rack gears 202—202, as the cam 192 is rotated in a clockwise direction, as viewed in FIG. 10, to return the cam follower 194 and bar 196 to the position illustrated, the spring 214—214 cause the yokes 210—210 and the rods 212—212 to move upwardly. The movement of the yokes 210—210 and the rods 212—212 in the upward direction in the pinion gears 199—199 and 201—201 and the rack gears 197—197 and 202—202 moving upwardly until the rods 212—212 arrive at the position illustrated in FIG. 10. When the rods 212—212 have completed their upward travel, further movement of the bar 196 with respect to the rods 212—212 causes a relative upward movement of the depending rack rods 195—195 and rack gears 197—197 with respect to the axis of rotation of the pinion gears 199—199 and 201—201. The upward movement of the rack gears 197—197 with respect to the pinion gears 199—199 results in the rotation of the pinion gears 199—199 and 201—201 and longitudinal, horizontal reciprocation of the rack gears 202—202 and their projecting ends 203—203 to the positions illustrated in FIG. 10, in preparation for a subsequent operation.

The empty mold 21 is then indexed to a mold reverting station, designated generally by the numeral 220, where the mold 21 is rotated through 180° to its original upright position. The mold reverting station 220 is substantially identical in construction to the mold inverting station 130 described above, but is illustrated in detail in FIG. 11.

As viewed in FIGS. 7 and 11, the mold inverting and reverting stations 130 and 220, respectively, include the drum cam 151 which, when rotated, causes the cam follower 148 to move axially of the cam 151 and cam shaft 73 to oscillate the crank arm 146 mounted pivotally on the shaft 144. The clutch 147 is provided for normally preventing relative movement between the crank arm 146 and the shaft 144.

On opposing ends of the shaft 144 are secured segmented gears 142 and 143 which engage pinion gears 140 and 141 secured to the shaft portions 136 and 137 of the paws 131 and 132. The pinion gears 140 and 141, in turn, engage racks 222 and 221, respectively, on opposing sides of the apparatus. The racks 221 and 222 are mounted slidably on flat bearings 223—223 secured fixedly to the blocks 139—139 and blocks 225—225 and thus the frame portion of the apparatus by stub rods 224—224.

The racks 221 and 222 are in engagement with pinion gears 226 and 227, respectively, which, in turn, are secured to shaft portions 228 and 229 of paws, designated generally by the numerals 231 and 232, which are identical in construction to paws 132 and 131, respectively. The reciprocation of the racks 221 and 222, described above, will cause the paws 231 and 232 to oscillate and the mold 21 therein to be reverted.

It should be noted that paws 131 and 232 have spring-biased plungers 233—233 which engage the ends of the mold 21 to prevent them from falling from the paws 131 and 132 and the paws 231 and 232 during the inversion and reversion thereof.

From the mold reverting station 220, the empty mold 21 is advanced to a station, designated generally by the numeral 240, wherein the ejector pin 47 is returned to its normal position so that the end thereof is flush with the portion 49 of the bottom of the mold cavity 28.

As illustrated in FIG. 11, the station 240 in which the ejector pin 47 is returned to its normal position includes a slotted cam 241 in which portions of a slot 242 in the cam 241 are eccentric with respect to the axis of the cam shaft 66. When the cam 241 is rotated by the cam shaft 66, a cam follower 243, mounted slidably and rotatably in the cam slot 242, causes a housing 244, mounted slidably in a horizontal block 246, and a spring-biased plunger 247 mounted slidably in the housing 244, to be reciprocated to push the ejector pin 47 downwardly so that the end thereof is flush with the bottom portion 49 of the mold cavity 28.

A spring 248 in the housing 244 permits the plunger 247 to slide within the housing 244 if, for some reason, the ejector pin 47 is jammed or an excessive amount of force is required to move the plunger 247 with respect to the mold 21. In that event, the spring-biased plunger 247 slides into the housing 244 against the action of the compression spring 248.

After the last-mentioned operation, the empty mold 21 is advanced to a spraying station, designated generally by the numeral 250, wherein cleaning fluid or a material which acts as an anti-adhering agent between the mold and the cast resin subsequently placed therein is sprayed into the mold by a nozzle 251 connected to an appropriate source of fluid or material (not shown) for the purpose of dissolving any resin particles adhering to the mold. The spraying operation is controlled by a switch 252 actuated by a cam actuator 253 secured to the cam shaft 66. The mold 21 is then advanced by the reciprocating hitch feed 77 and pushed onto the endless belt conveyor 80 to remove the empty mold 21 from the apparatus.

*Operation*

During the operation of the apparatus for removing the cast resin terminal strip assembly 22 from the mold 21, the mold containing the assembly 22 enters the apparatus from an appropriate conveyor 79 which carries the mold 21 containing the molded terminal assembly 22 to the apparatus from a curing oven (not shown). As the mold 21 enters the apparatus, with the open portion thereof facing upwardly, it is passed through the mold gauging station 120.

In the mold gauging station 120 and mold 21 is gauged and prevented from advancing further into the apparatus if it should be oversized, as a result of excessive casting resin or the like. If the mold is too large to pass through the apparatus, a sensitive switch 127 is operated to de-energize the motor 67 of the apparatus.

From the mold gauging station 120, the mold 21 is indexed to the mold inverting station 130 which is designed to turn the mold 21 upside down. In operation, the mold 21 is indexed between the paws 131 and 132, and the paws 131 and 132 are rotated 180° to invert the mold 21.

The next operation on the inverted mold 21 is performed at the station 160 wherein the core pins 37 and 38 are retracted and held for a predetermined time in the retracted position. While the core pins 37 and 38 are held in their retracted position a spring-biased plunger 186 is forced downwardly against the ejector pin 47 which is now positioned at the top of the inverted mold 21. The plunger 186 forces the ejector pin 47 downwardly to loosen the finished cast resin terminal assembly 22 in the mold cavity 28 and to partially eject the terminal assembly 22 from the mold cavity 28 so that it extends partially out of the mold 21. Subsequently, the core pins 37 and 38 are reseated or returned to their normal, inserted position wherein the ends 39 and 41, respectively, thereof project into the now empty portion of the mold cavity 28.

The mold 21 with the finished cast resin terminal assembly 22 partially removed therefrom is next advanced to a stripping station 190 wherein stripping fingers 203—203 are moved inwardly through the open ends 29 and 31 of the mold 21, between the cast resin terminal assembly 22 and a portion 49 of the bottom surface of the mold cavity 28, and forced downwardly to force the terminal assembly 22 out of the cavity 28. When the assembly 22 is stripped completely from the mold 21, it drops onto a moving, endless belt conveyor 191 positioned directly below the station 190, which carries the finished assembly 22 away from the apparatus.

The empty mold 21 is then indexed to a mold reverting station 220 where the mold 21 is rotated 180° to its original upright position. From the mold reverting station 220, the mold 21 is advanced to the station 240 wherein the ejector pin 47 is returned to its normal position by a spring-biased plunger 247.

After the ejector pin 47 has been returned to its normal position, the mold 21 is then advanced to the spraying station 250 where cleaning fluid or material which acts as an anti-adhering agent between the mold and the cast resin subsequently placed therein is sprayed into the mold cavity 28 for the purpose of dissolving any resin particles adhering thereto. From the mold spraying station 250 the mold 21 is advanced onto a moving endless belt conveyor 80 positioned at the discharge end of the apparatus to remove the empty mold 21 from the apparatus.

All of the above operations are performed automatically and each of the above-described operations are conducted simultaneously on a series of successive molds positioned at the various stations. When the operation is completed, each mold is moved simultaneously to a succeeding station and all stations are operated in a timed sequence. The apparatus is designed so that any irregularity that would affect the operation of the apparatus will be detected and the apparatus will be stopped automatically.

It is to be understood that the above-described arrangements are simply illustrative of the principles of the invention. Other arrangements may be devised by those skilled in the art which embody the principles of the invention and fall within the spirit and scope thereof.

What is claimed is:

Apparatus for removing molded articles of manufacture from open-faced, open-ended molds having at least one ejector pin, which comprises a frame, means for advancing molds having ejector pins therein through the apparatus, means for supporting the molds as the molds are advanced through the apparatus, means for pushing the ejector pins of the molds partially into the cavities of the molds for partially ejecting molded articles therefrom, a stationary, apertured, horizontally extending block supported by the frame, a pair of spaced, vertically extending rods mounted slidably in the horizontal block, resilient means for supporting the rods and for maintaining the rods normally in a predetermined vertical position, a vertically reciprocable yoke secured to the lower extremities of each of the rods and positioned normally in a predetermined vertical position by the resilient means, a pair of rotatable pinion gears mounted coaxially in each of the yokes, the gears forming each pair of gears being secured operatively together for rotation in the associated yoke about a common axis, a horizontally extending gear rack mounted in each of the yokes for horizontal axial movement with respect thereto and vertical transverse movement with the associated yoke, the teeth of each of the gear racks engaging one of the pinion gears mounted in the associated yoke, the gear racks having axially projecting, tapered stripping fingers horizontally, longitudinally reciprocable into the open ends of the molds and into the empty portions of the cavities thereof adjacent to the partially ejected molded articles, a horizontal bar mounted slidably on the frame for vertical lateral movement, the horizontal bar having portions thereof in alignment with the ends of the rods for engagement therewith, a vertically depending gear-rack rod secured adjacent to each end of the horizontal bar and mounted slidably in the horizontally extending block and in an associated one of the yokes, the teeth of each of the vertically depending gear-rack rods engaging the other one of the pair of pinion gears in the associated yoke, a cam follower secured to the horizontal bar for vertical movement therewith, a rotary cam having an eccentric camming surface engaging the cam follower to move the horizontal bar laterally vertically toward the yokes and the depending gear-rack rods secured to the bar vertically through the yokes to turn the pinion gears mounted therein and thus to move the stripping fingers of the gear racks axially horizontally into the open ends of the molds until the bar strikes the vertical rods to prevent relative movement of the horizontal bar with respect to the yokes so that the gear-rack rods, the gear racks and pinion gears are prevented from moving with respect to each other and the yokes and pinion gears are moved vertically with the bar to carry the stripping fingers of the gear racks laterally vertically to strip the molded article completely from the mold, and means for automatically operating the advancing means, the ejecting means and cam in timed sequence so that articles are stripped from a series of molds advancing successively through the apparatus.

References Cited in the file of this patent

UNITED STATES PATENTS

| | | |
|---|---|---|
| 1,706,874 | De Journo | Mar. 26, 1929 |
| 1,885,360 | Kuhne | Nov. 1, 1932 |
| 2,047,379 | Matson | July 14, 1936 |
| 2,275,561 | Sahlin | Mar. 10, 1942 |
| 2,312,215 | Howie | Feb. 23, 1943 |
| 2,428,878 | Johnson | Oct. 14, 1947 |
| 2,444,339 | Dinzl | June 29, 1948 |
| 2,582,891 | Strauss | Jan. 15, 1952 |
| 2,649,943 | Meyers | Aug. 25, 1953 |
| 2,688,159 | Swartz | Sept. 7, 1954 |
| 2,741,797 | Britton | Apr. 17, 1956 |
| 2,834,988 | Morris | May 20, 1958 |

FOREIGN PATENTS

| | | |
|---|---|---|
| 962,726 | France | June 19, 1950 |

UNITED STATES PATENT OFFICE
CERTIFICATE OF CORRECTION

Patent No. 2,988,773 June 20, 1961

Alexander Logan

It is hereby certified that error appears in the above numbered patent requiring correction and that the said Letters Patent should read as corrected below.

Column 9, line 48, after "direction" insert -- results --; column 11, line 17, for "in" read -- is --.

Signed and sealed this 7th day of November 1961.

(SEAL)
Attest:

ERNEST W. SWIDER
Attesting Officer

DAVID L. LADD
Commissioner of Patents

USCOMM-DC